United States Patent
Shizume

(10) Patent No.: US 7,361,121 B2
(45) Date of Patent: Apr. 22, 2008

(54) CONTROL DEVICE AND METHOD FOR INPUT CLUTCH OF WORK VEHICLE

(75) Inventor: Masaru Shizume, Mooka (JP)

(73) Assignee: Komatsu Ltd., Tokyo (JP)

( * ) Notice: Subject to any disclaimer, the term of this patent is extended or adjusted under 35 U.S.C. 154(b) by 205 days.

(21) Appl. No.: 10/576,110

(22) PCT Filed: Aug. 30, 2005

(86) PCT No.: PCT/JP2005/015777

§ 371 (c)(1),
(2), (4) Date: Apr. 18, 2006

(87) PCT Pub. No.: WO2006/025394

PCT Pub. Date: Mar. 9, 2006

(65) Prior Publication Data

US 2007/0054776 A1    Mar. 8, 2007

(30) Foreign Application Priority Data

Aug. 30, 2004   (JP) .............................. 2004-249704

(51) Int. Cl.
*B60W 10/02*   (2006.01)
(52) U.S. Cl. ...................... 477/180; 477/169; 477/172; 477/174; 192/3.24; 192/12 C; 192/13 R; 192/109 F
(58) Field of Classification Search .................... None
See application file for complete search history.

(56) References Cited

U.S. PATENT DOCUMENTS

| | | | |
|---|---|---|---|
| 4,865,176 A | | 9/1989 | Blake et al. |
| 6,647,332 B1 | | 11/2003 | Esterby et al. |
| 6,692,409 B2 | * | 2/2004 | Fukumoto et al. .......... 477/174 |
| 6,955,628 B2 | * | 10/2005 | Fukumoto et al. ............ 477/70 |
| 7,048,106 B2 | * | 5/2006 | Hou ....................... 192/103 F |
| 7,153,235 B2 | * | 12/2006 | Takamura et al. .......... 477/172 |

FOREIGN PATENT DOCUMENTS

| | | |
|---|---|---|
| EP | 0 141 005 | 5/1985 |
| JP | 2-503345 | 10/1990 |
| JP | 3-24358 | 2/1991 |
| JP | 5-502834 | 5/1993 |
| JP | 2002-295526 | 10/2002 |

* cited by examiner

*Primary Examiner*—David D. Le
(74) *Attorney, Agent, or Firm*—Wenderoth, Lind & Ponack, L.L.P.

(57) ABSTRACT

A controller serving as determination device determines whether or not a rising speed of the clutch pressure of the input clutch is less than a limit rising speed of the original pressure. A controller serving as original pressure control device adjusts the original pressure such that a difference between the original pressure and the detected clutch pressure of the input clutch becomes a predetermined offset pressure when it is determined that the clutch pressure rising speed of the input clutch is less than the original pressure limit rising speed, and adjusts the original pressure such that the original pressure is raised at the original pressure limit rising speed when it is determined that the clutch pressure rising speed of the input clutch is equal to or higher than the original pressure limit rising speed.

4 Claims, 4 Drawing Sheets

CONTROL DEVICE AND METHOD FOR INPUT CLUTCH OF WORK VEHICLE

TECHNICAL FIELD

The present invention relates to a control device and method for an input clutch (modulation clutch), applicable to a work vehicle having an input clutch provided between an engine and a transmission.

BACKGROUND ART

Driving power of a wheel loader engine is divided to two power transmission paths, namely drive and working power transmission paths. This means that the driving power of the engine is supplied to a drive power train and a work machine hydraulic pump via a PTO shaft to be divided into drive horsepower and work horsepower.

An input clutch (modulation clutch) is provided between the engine and the transmission in the power transmission path of the drive power train.

The input clutch is provided for adjusting the power transmitted to the drive power train to increase the power transmitted to the work machine via the work machine hydraulic pump according to a work condition or to prevent the vehicle from slippage.

In order to cause the wheel loader to dig the ground to do an excavation work, the operator is required to decrease the speed of the vehicle body while depressing an accelerator pedal to keep the engine speed high. Therefore, the operator depresses a brake pedal to actuate a brake to decrease the speed of the vehicle body. At the same time, the clutch pressure of the input clutch is decreased to enhance the braking effectiveness, while the engine driving power transmitted to the drive power train is decreased to increase the amount of driving power allocated to the work machine hydraulic pump by that much.

Patent Publication 1 specified below describes an invention according to which a signal corresponding to a depression amount of the brake pedal is transmitted to a control valve for controlling the input clutch to actuate the control valve, and the clutch pressure of the input clutch is adjusted by the control valve to decrease the input clutch pressure according to the brake pedal depression amount.

Patent Publication 1: Published Japanese Translation of PCT Publication for a Patent Application-(Toku Kohyou) NO. 5-502834

DISCLOSURE OF THE INVENTION

Problems to be Solved by the Invention

During the excavation work as described above, the operator often operates the brake pedal rapidly. This means that the brake pedal is depressed rapidly when the brake is actuated, whereas the operator's foot is rapidly removed form the brake pedal when the brake is released and the state in which the brake pedal is not depressed is restored rapidly.

The Patent publication 1 above only describes that the clutch pressure of the input clutch is varied according to the depression amount of the brake pedal.

If the brake pedal is rapidly returned from the depressed state to the undepressed state for releasing the brake, the clutch pressure of the input clutch will be raised rapidly. This will cause the occurrence of large torque variation when the clutch input side and the clutch output side of the input clutch are connected (engaged) with each other, and thus a large shock may be given to the operator and the vehicle. Additionally, since the accelerator pedal is depressed to keep the engine speed high during the excavation work, the engine driving power itself becomes great and hence the load applied to the input clutch is made even greater.

The input clutch is worn fast when subjected to a large load, and the durability is adversely affected thereby. Therefore, there is a demand for a technique to prevent the input clutch from rapid connection (engagement) even if the brake pedal is rapidly returned to the undepressed state for releasing the brake.

After depressing the brake pedal and before releasing the brake, the operator sometimes changes the brake pedal rapidly in a short period of time in order to perform fine adjustment of the vehicle body speed or work machine driving power. There is a demand for a technique for varying the clutch pressure of the input clutch faithfully according to the change in the brake pedal with high responsiveness, and thus for enabling the fine adjustment to be done with high accuracy.

The present invention has been made in view of the circumstances as described above. It is therefore an object of the present invention is to prevent the input clutch from rapid connection (engagement) to suppress the occurrence of large torque variation when the brake is released. It is also an object of the invention to enable the fine adjustment done by brake operating means such as a brake pedal to be performed with high accuracy by varying the clutch pressure of the input clutch with high responsiveness to the change in the brake operating means.

Means for Solving the Problems

A first aspect of the invention provides a control device for an input clutch of a work vehicle, comprising:

an input clutch provided between an engine and a transmission on a power transmission path for the engine;

an orifice provided on an oil passage supplying pressure oil to the input clutch, the orifice having an original pressure at an upstream side and a clutch pressure of the input clutch at a downstream side;

input clutch pressure control means provided to communicate with the oil passage on the downstream side from the orifice to control the clutch pressure of the input clutch such that the clutch pressure of the input clutch is reduced as an operation amount becomes greater;

clutch pressure detection means for detecting the clutch pressure of the input clutch;

determination means for determining whether or not a rising speed of the clutch pressure of the input clutch is less than a limit rising speed of the original pressure; and original pressure control means which adjusts the original pressure such that a difference between the original pressure and the detected clutch pressure of the input clutch becomes a predetermined offset pressure when it is determined that the clutch pressure rising speed of the input clutch is less than the original pressure limit rising speed, and adjusts the original pressure such that the original pressure is raised at the original pressure limit rising speed when it is determined that the clutch pressure rising speed of the input clutch is equal to or higher than the original pressure limit rising speed.

A second aspect of the invention according to the first aspect is characterized in that brake means for reducing a speed of a vehicle body; and
brake operating means for actuating the brake means with a braking force according to an operation amount are further provided, and
the input clutch pressure control means controls the clutch pressure of the input clutch such that the clutch pressure of the input clutch is reduced as the operation amount of the brake operating means becomes greater.

A third aspect of the invention provides a control device for an input clutch of a work vehicle, comprising:
an input clutch provided between an engine and a transmission on a power transmission path for the engine;
brake means for reducing a speed of a vehicle body;
brake operating means for actuating the brake means with a braking force according to an operation amount;
an orifice provided on an oil passage supplying pressure oil to the input clutch, the orifice having an original pressure at an upstream side and a clutch pressure of the input clutch at a downstream side;
input clutch pressure control means provided to communicate with the oil passage on the downstream side from the orifice to control the clutch pressure of the input clutch such that the clutch pressure of the input clutch is reduced as the operation amount becomes greater;
clutch pressure detection means for detecting the clutch pressure of the input clutch;
determination means for determining whether or not a rising speed of the clutch pressure of the input clutch is less than a limit rising speed of the original pressure; and
original pressure control means for adjusting the original pressure such that the original pressure is raised at the original pressure limit rising speed when it is determined that the clutch pressure rising speed of the input clutch is equal to or higher than the original pressure limit rising speed.

A fourth aspect of the invention provides a control method for an input clutch applicable to a work vehicle comprising:
an input clutch provided between an engine and a transmission on a power transmission path for the engine;
an orifice provided on an oil passage supplying pressure oil to the input clutch, the orifice having an original pressure at an upstream side and a clutch pressure of the input clutch at a downstream side;
input clutch pressure control means arranged to communicate with the oil passage on the downstream side from the orifice to control the clutch pressure of the input clutch such that the clutch pressure of the input clutch is reduced as an operation amount becomes greater; and
clutch pressure detection means for detecting the clutch pressure of the input clutch,
the control method comprising the steps of:
a) determining whether or not a rising speed of the clutch pressure of the input clutch is less than a limit rising speed of the original pressure; and
b) adjusting the original pressure such that a difference between the original pressure and the detected clutch pressure of the input clutch becomes a predetermined offset pressure, when it is determined that the clutch pressure rising speed of the input clutch is less than the original pressure limit rising speed, or
adjusting the original pressure such that the original pressure is raised at the original pressure limit rising speed, when it is determined that the clutch pressure rising speed of the input clutch is equal to or higher than the original pressure limit rising speed.

According to the present invention, as shown in FIG. 1, an input clutch 10 is provided, in a power transmission path for an engine 1 of a wheel loader 100, between the engine 1 and a transmission 4. When brake operating means 22 is operated, brake means 23 and 25 are actuated by a braking force according to the operation amount to decrease the speed of the vehicle body.

An oil drain passage 20 and a pressure reducing valve 21 together form input clutch pressure control means. The input clutch pressure control means 20 and 21 control the clutch pressure of the input clutch 10 such that the clutch pressure Pc of the input clutch 10 is decreased as the operation amount of the brake operating means 22 becomes greater.

In an oil supplying passage 14 for supplying pressure oil to the input clutch 10, there is provided an orifice 15 having an original pressure P at the upstream side and a clutch pressure Pc of the input clutch 10 at the downstream side.

The clutch pressure Pc of the input clutch 10 is detected by clutch pressure detection means 16.

A controller 24 serving as determination means determines, as shown in FIG. 2, whether or not a rising speed of the clutch pressure 10 of the input clutch 10 is less than a limit rising speed of the original pressure Pm (step 54 in FIG. 2).

If it is determined that the clutch pressure rising speed of the input clutch 10 is less than the original pressure limit rising speed (determined YES in step 54), as shown in FIG. 2, the controller 24 serving as original pressure control means adjusts the original pressure Pm such that a difference between the original pressure Pm and the detected clutch pressure Pc of the input clutch 10 becomes a predetermined offset pressure Ps (step 53). If it is determined that the clutch pressure rising speed of the input clutch 10 is equal to or higher than the original pressure limit rising speed (determined NO in step 54), the controller 24 adjusts the original pressure Pm such that the original pressure Pm rises at the original pressure limit rising speed (step 58).

As the result, as shown in time T2 to T3 in FIG. 3(a), for example, the difference between the original pressure Pm and the detected clutch pressure Pc of the input clutch 10 is kept at the predetermined offset pressure Ps as long as the clutch pressure rising speed of the input clutch 10 is less than the original pressure limit rising speed, and the original pressure Pm is higher than the clutch pressure Pc of the input clutch 10 by the offset pressure Ps, that is, the original pressure Pm has an allowance corresponding to the offset pressure Ps. It is here assumed that the brake operating means 22 is changed rapidly (at a high rising speed) in a short period from time T3 to T34 in order to perform fine adjustment. Since the original pressure Pm is already higher than the clutch pressure Pc by the allowance of the offset pressure Ps, the clutch pressure Pc does not reach the original pressure Pm in such a short period of time as from T3 to T34, even if the clutch pressure Pc is raised rapidly, and is able to vary rapidly with high responsiveness to the rapid change of the brake operating means 22. As the result, during the fine adjustment performed with the use of the brake operating means 22, the clutch pressure Pc of the input clutch 10 varies with high responsiveness to the change of the brake operating means 22, enabling the fine adjustment of the vehicle body speed and the engine driving power allocated to the work machine.

When the operator rapidly returns the brake operating means 22 from the depressed state to the undepressed state in order to release the brake means 23 and 25 at time T5, the clutch pressure Pc of the input clutch 10 rises rapidly from time T5 until reaching the original pressure Pm at time T6. From time T5 onward, the rising speed of the original pressure Pm is restricted to the original pressure limit rising speed. Therefore, after reaching the original pressure Pm at time T6, the clutch pressure Pc of the input clutch 10 rises while being restricted to the same rising speed as the rising speed (limit rising speed) of the original pressure Pm. As the result, the input clutch 10 can be prevented from being rapidly connected (engaged) when the brake is released, and the large torque variation can be suppressed.

According to the present invention, as described above, the input clutch 10 can be prevented from being rapidly connected (engaged) when the brake is released, and the large torque variation can be suppressed. Additionally, when the fine adjustment is performed with the use of the brake operating means, the clutch pressure of the input clutch is varied with high responsiveness to the change of the brake operating means, whereby the fine adjustment can be performed with high accuracy.

The applicable range of the present invention is not limited to the case in which the clutch pressure Pc of the input clutch 10 is varied according to the operation amount of the brake operating means 22 (the second aspect of the invention). The present invention is equally applicable to the case in which the clutch pressure Pc of the input clutch 10 is varied according to an operation amount of any other operating means (the first and fourth aspects of the invention).

Further, it is also possible to omit the processing to adjust the original pressure Pm so as to make the difference between the original pressure Pm and the detected clutch pressure Pc of the input clutch 10 equal to the predetermined offset pressure Ps (step 53), when it is determined that the clutch pressure rising speed of the input clutch 10 is less than the original pressure limit rising speed (determined YES in step 54) (the third aspect of the invention). In this case as well, if it is determined that the clutch pressure rising speed of the input clutch 10 is equal to or higher than the original pressure limit rising speed (determined NO in step 54), the original pressure Pm is adjusted such that the rising speed of the original pressure Pm is equal to the original pressure limit rising speed (step 58). Therefore, the input clutch can be prevented from being rapidly connected (engaged) at least when the brake is released. Thus, the present invention provides an advantageous effect of suppressing the occurrence of large torque variation.

BEST MODE FOR CARRYING OUT THE INVENTION

Preferred embodiments of the present invention will be described with reference to the drawings.

FIG. 1 is a block diagram of an input clutch control device for a work vehicle according to a preferred embodiment, showing a part of the configuration of a wheel loader relating to the present invention.

As shown in FIG. 1, driving power of an engine 1 of a wheel loader 100 is supplied, via a PTO shaft 30, to a drive power train and a work machine hydraulic pump 2 to be divided into drive horsepower and work horsepower.

Specifically, the output shaft of the engine 1 of the wheel loader 100 is connected to the PTO shaft 30, and the PTO shaft 30 is connected to the drive power train as well as to the work machine hydraulic pump 2.

A transmission 4 having a forward clutch, a reverse clutch, and gear clutches is provided in a power transmission path 40 of the engine 1 corresponding to the drive power train.

An input clutch (modulation clutch) 10 is provided between the engine 1 and the transmission 4 in the power transmission path 40 of the engine. The input clutch 10 is a wet multiplate hydraulic clutch.

An output of the engine 1 is transmitted to drive wheels 6 via the input clutch 10, a torque converter 3, the transmission 4, and a reduction gear (differential gear) 5.

Frictional engagement force between the input side and the output side of the input clutch 10 is controlled by adjusting a clutch pressure Pc of pressure oil supplied to the input clutch 10. The input clutch 10 is connected (engaged) completely when the clutch pressure Pc of the pressure oil supplied to the input clutch 10 is a maximum pressure, or a hold pressure P1. When the clutch pressure Pc of the pressure oil supplied to the input clutch 10 is decreased from the hold pressure P1, the input clutch 10 is shifted from the completely connected (engaged) state to the unconnected (released) state.

The drive wheels 6, 6 are provided with a brake device 25 for braking the drive wheel 6 to decrease the speed of the vehicle body. The brake device 25 is a hydraulic brake device that is actuated or released (unactuated) according a pressure of hydraulic oil supplied to the brake device 25 (brake pressure).

A brake control valve 23 has a brake actuating position 23A and a brake releasing position 23B. The pressure of the hydraulic oil supplied to the brake device 25 (brake pressure) is varied according to the actuating position of the brake control valve 23. The brake device 25 is actuated when the brake control valve 23 is shifted to the brake actuating position 23A. The actuation of the brake device 25 is deactuated (released) when the brake control valve 23 is shifted to the brake releasing position 23B. The description of this embodiment assumes a brake system in which the braking force generated by the brake device 25 is increased as the brake pressure becomes greater.

The input clutch 10 is provided with an input clutch control valve 12 for controlling the original pressure Pm of the pressure oil supplied to the input clutch 10.

The work machine hydraulic pump 2 has an oil discharge passage 11 communicating with the inlet of the input clutch control valve 12. A relief valve 13 is provided in the oil discharge passage 11. A relief set pressure of the relief valve 13 is set to the hold pressure P1 that is the maximum pressure of the clutch pressure Pc of the input clutch 10. The outlet of the input clutch control valve 12 communicates with an oil supplying passage 14. The oil supplying passage 14 is an oil passage for supplying pressure oil to the input clutch 10 and communicates with the input clutch 10. The oil supplying passage 14 is provided with an orifice 15 having the original pressure P at the upstream side and the clutch pressure Pc of the input clutch 10 at the downstream side.

Pressure detection means 16 is provided at the downstream side of the orifice 15 so that the clutch pressure Pc of the input clutch 10 is detected by detecting the pressure oil in the oil supplying passage 14. A detection signal indicating the clutch pressure Pc detected by the pressure detection means 16 is input to the controller 24.

The controller 24 generates a control signal for adjusting the original pressure Pm of the input clutch 10 based on the detected clutch pressure Pc and outputs the same to the input clutch control valve 12.

The input clutch control valve 12 outputs pressure oil at the original pressure Pm corresponding to the control signal received from the controller 24 to the oil supplying passage 14.

A brake pedal 22 serving as brake operating means, which is operated by being depressed with the operator's left foot, is arranged at the front left side of driver seat in the wheel loader 100.

A oil drain passage 20 and a pressure reducing valve 21 together form input clutch pressure control means. The input clutch pressure control means 20 and 21 control the clutch pressure Pc of the input clutch 10 such that the clutch pressure Pc of the input clutch 10 is decreased as the depression amount (pedal stroke) of the brake pedal 22 becomes greater.

Specifically, the oil supplying passage 14 on the downstream side of the orifice 15 is branched to and communicates with oil drain passage 20.

The oil drain passage 20 is provided with the pressure reducing valve 21. The outlet of the pressure reducing valve 21 communicates with a tank 7.

The brake pedal 22 is connected to the pressure reducing valve 21. The brake pedal 22 is connected to the pressure reducing valve 21 such that the opening area of the aperture of the pressure reducing valve 21 is increased as the depression amount of the brake pedal 22 becomes greater.

The pressure reducing valve 21 is connected to the brake control valve 23 via a spring 26. The pressure reducing valve 21 is connected to the brake control valve 23 such that the brake control valve 23 is shifted from the brake releasing position 23B to the brake actuating position 23A as the depression amount of the brake pedal 22 becomes greater.

Accordingly, the braking force generated by the brake device 25 is increased as the depression amount of the brake pedal 22 becomes greater.

Additionally, the opening area of the aperture of the pressure reducing valve 21 is increased as the operation amount of the brake pedal 22 becomes greater, and thus the quantity of pressure oil discharged from the oil supplying passage 14 to the tank 7 via the oil drain passage 20 and the pressure reducing valve 21 is also increased. As the quantity of oil discharged to the tank 7 is increased, the clutch Pc is lowered. The reduction of the clutch pressure Pc of the input clutch 10 allows the input clutch 10 to slide, whereby the driving power transmitted to the transmission 4 from the engine 1 through the input clutch 10 is reduced, and thus the vehicle speed of the wheel loader 100 is reduced.

FIG. 4 shows relationship between a depression amount (pedal stroke: 0 to 100%) of the brake pedal 22, clutch pressure Pc(kg/cm2) of the input clutch 10, and braking force (brake pressure: kg/cm2) generated by the brake device 25. FIG. 4 shows only an example of characteristics, and the present invention is not limited to these.

FIG. 2 is a flowchart of an input clutch control method according to the present embodiment, showing the flow of processing performed by the controller 24.

The following description will be made on the assumption that the operator rapidly depresses the brake pedal 22 to make the pedal stroke 100% while the wheel loader 100 is performing an excavation work, then rapidly changes the brake pedal 22 in a short period of time for performing fine adjustment of the vehicle body speed and the driving power for the work machine, and then rapidly removes the foot from the brake pedal 22 to return the brake pedal 22 to the undepressed state (pedal stroke is 0%) rapidly.

FIG. 3(a) illustrates how the clutch pressure Pc of the input clutch 10 and the original pressure Pm are varied in accordance with passage of time, wherein time T is plotted on the abscissa axis and the clutch pressure Pc of the input clutch 10 and the original pressure Pm are plotted on the ordinate axis. In FIG. 3(a), the clutch pressure Pc is indicated by the solid line and the original pressure Pm is indicated by the broken line.

FIG. 3(b) illustrates how the depression amount of the brake pedal 22 is varied according time variation, wherein the abscissa axis of FIG. 3(a) is used in common as the time axis.

FIG. 3(c) illustrates how the clutch pressure of the input clutch is varied according to time variation, wherein the abscissa axis of FIG. 3(a) is used in common as the time axis.

As shown in FIG. 2, when the processing is started (step 50), the original pressure Pm of the input clutch 10 is set to a hold pressure P1 that is a set relief pressure of the relief valve 13 and a maximum pressure of the clutch pressure Pc, in the initial state. In this condition, the input clutch 10 is in the completely connected (engaged) state, and the input clutch 10 transfers all of the driving power at the clutch input side to the clutch output side without sliding (step 51; until time T1 in FIG. 3(a)).

Subsequently, it is determined whether or not the clutch pressure Pc is less than a predetermined value P2. The predetermined value P2 is prestored in the controller 24, as a threshold value for determining whether or not the clutch pressure Pc has been reduced from the hold pressure P1 (step 52).

When the operator starts depressing the brake pedal 22 at time T1, the processing proceeds to step 59 to be returned to the starting step 50 if the clutch pressure Pc is equal to or higher than the predetermined value P2 (determined NO in step 52; time T1 to T2 in FIG. 3(a)). When the clutch pressure Pc then becomes less than the predetermined value P2 at time T2 (determined YES in step 52; from time T2 in FIG. 3(a)), the processing proceeds to the next step 53.

In step 53, the controller 24 adjusts the original pressure Pm such that a difference between the original pressure Pm of the input clutch 10 and the detected clutch pressure Pc of the input clutch 10 becomes a predetermined offset pressure Ps (step 53).

The controller 24 then determines whether or not the rising speed of the clutch pressure 10 of the input clutch 10 is less than a limit rising speed of the original pressure Pm. The limit rising speed of the original pressure Pm is prestored in the controller 24 as such a value that does not cause a large shock when the input clutch 10 is engaged. The clutch pressure rising speed can be computed based on the clutch pressure Pc detected at every predetermined time (step 54).

If the clutch pressure rising speed of the input clutch 10 is determined to be less than the original pressure limit rising speed (determined YES in step 54), the original pressure Pm is adjusted such that the difference between the original pressure Pm and the detected clutch pressure Pc of the input clutch 10 becomes the predetermined offset pressure Ps (step 53) provided that the original pressure Pm is less than the hold pressure P1, or the maximum pressure (determined YES in step 55).

In contrast, if it is determined that the clutch pressure rising speed of the input clutch 10 is equal to or higher than the original pressure limit rising speed (determined NO in step 54), the original pressure Pm is adjusted such that the original pressure Pm is raised while being restricted to the original pressure limit rising speed (step 56). In this case, the original pressure Pm is continued to be raised while being restricted to the original pressure limit rising speed, as long as the difference between the original pressure Pm and the clutch pressure Pc is less than the offset pressure Ps (determined YES in step 57), and the original pressure Pm is less than the hold pressure P1, that is the maximum pressure (determined YES in step 58) (step 58). If the difference between the original pressure Pm and the clutch pressure Pc becomes the offset pressure Ps or higher (determined NO in step 57), the processing returns to step 53, where the original pressure Pm is adjusted such the difference between the original pressure Pm and the detected clutch pressure Pc of the input clutch 10 becomes the predetermined offset pressure Ps (step 53).

In this manner, the controller 24 adjusts the original pressure Pm such that the difference between the original pressure Pm and the detected clutch pressure Pc of the input clutch 10 becomes the predetermined offset pressure Ps (step 53), when it is determined that the clutch pressure rising speed of the input clutch 10 is less than the original pressure limit rising speed (determined YES in step 54), and adjusts the original pressure Pm such that the original pressure Pm rises at the original pressure limit rising speed (step 58) when it is determined that the clutch pressure rising speed of the input clutch 10 is equal to or higher than original pressure limit rising speed (determined NO in step 54).

Accordingly, as shown in FIG. 3(a), for example, the clutch pressure of the input clutch 10 is in a pressure reducing state and in a state held at a fixed pressure in the periods from time T2 to T23 and from time T23 to T3, respectively. Therefore, when the clutch pressure rising speed is less than the original pressure limit rising speed, the difference between the original pressure Pm and the detected clutch pressure Pc of the input clutch 10 is held at the predetermined offset pressure Ps, and thus the original pressure Pm has an allowance, being higher than the clutch pressure Pc of the input clutch 10 by the offset pressure Ps (determined YES in step 54 and step 53; from time T2 to T23 and from time T23 to T3 in FIG. 3(a)).

It is here assumed that the brake pedal 22 is changed rapidly (at a high rising speed) in a short period of time from time T3 to T34 in order to perform the fine adjustment. Since the original pressure Pm already has the allowance, being higher than the clutch pressure Pc by the offset pressure Ps, the clutch pressure Pc does not reach the original pressure Pm in this short period of time from T3 to T34 even if the clutch pressure Pc is raised rapidly, and is allowed to vary rapidly with high responsiveness to the rapid change of the brake pedal 22 during the fine adjustment with the use of the brake pedal 22. As the result, the clutch pressure Pc of the input clutch 10 is varied with high responsiveness to the change in the brake pedal 22 to enable the fine adjustment of the vehicle body speed and the engine driving power allocated to the work machine to be performed with accuracy (determined NO in step 54 and step 58; time T3 to T34 in FIG. 3(a)).

In contrast, when the operator rapidly returns the brake pedal 22 from the depressed state to the undepressed state to release the brake device 25 at time T5, the clutch pressure Pc of the input clutch 10 is raised rapidly from time T5 and reaches the original pressure Pm at time T6. From time T5 onwards, the rising speed of the original pressure Pm is restricted to the original pressure limit rising speed. Therefore, once the clutch pressure Pc reaches the original pressure Pm at time T6, the clutch pressure Pc of the input clutch 10 is raised with its rising speed restricted to be same as the rising speed (limit rising speed) of the original pressure Pm. As the result, the input clutch 10 is prevented from being rapidly connected (engaged) when the brake is released, and thus the large torque variation can be suppressed (determined NO in steps 54 and step 58; from time T5 in FIG. 3(a)). When the original pressure Pm reaches the hold pressure P1 that is the maximum pressure (determined NO in step 58), the processing proceeds to step 59 and is returned to the starting step 50, where the original pressure Pm is set to the hold pressure P1 that is the maximum pressure of the clutch pressure Pc. Following this, the clutch pressure Pc also reaches the hold pressure P1 (time T7 in FIG. 3(a)).

FIGS. 3(b) and 3(c) illustrates the case in which the brake pedal 22 is rapidly returned after the fine adjustment is repeatedly performed with the use of the brake pedal 22. Since the processing performed by the controller 24 is the same as that of the flowchart of FIG. 2, the description thereof will be omitted here.

When the fine adjustment is repeatedly performed with the use of the brake pedal 22 in the period from time T11 to T12 as shown in FIG. 3(b), the clutch pressure Pc will not reach the original pressure Pm in such a short repetition period, as shown in FIG. 3(c), although the original pressure Pm is restricted by the original pressure limit rising speed indicated by the gradient a as shown by the broken line P'm. Therefore, the clutch pressure Pc of the input clutch 10 is varied with high responsiveness, well following to the repetition of rapid operation of the brake pedal 22.

When the brake pedal 22 is rapidly returned to the pedal stroke of 0% in the period from time T12 to T13 as shown FIG. 3(b), the original pressure Pm is raised while being restricted to the original pressure limit rising speed indicated by the gradient a as shown in FIG. 3(c), the clutch pressure Pc of the input clutch 10 is also raised while being restricted to the same rising speed as the limit rising speed of the original pressure Pm.

According to the present embodiment as described above, the input clutch 10 is prevented from being rapidly connected (engaged) when the brake is released, and the occurrence of large torque variation can be suppressed. Further, the clutch pressure Pc of the input clutch 10 is able to vary with high responsiveness to the change of the brake pedal 22 during the fine adjustment performed with the use of the brake pedal 22, whereby the fine adjustment can be performed with high accuracy.

The description of the embodiment above has been made in terms of the case in which the clutch pressure Pc of the input clutch 10 is varied in accordance with the depression amount of the brake pedal 22. However, the present invention is not limited to this, and the clutch pressure Pc of the input clutch 10 may be varied in accordance with an operation amount of any other operating means. For example, in FIG. 1, the brake pedal 22 may be replaced with a pedal or lever dedicated to the input clutch. The pressure reducing valve 21 and the brake control valve 23 may be provided separately from each other, so that the pressure reducing valve 21 is actuated by this pedal or lever without linkage with the brake control valve 23.

Additionally, although in the embodiment above, the original pressure Pm is adjusted such that the difference between the original pressure Pm and the detected clutch pressure Pc of the input clutch 10 becomes the predetermined offset pressure Ps (step 53) when it is determined that the clutch pressure rising speed of the input clutch 10 is less than the original pressure limit rising speed (determined YES in step 54), this processing may be omitted.

In this case as well, when it is determined that the clutch pressure rising speed of the input clutch 10 is equal to or higher than the original pressure limit rising speed (determined NO in step 54), the original pressure Pm is adjusted such that the rising speed of the original pressure Pm becomes the original pressure limit rising speed (step 58). Consequently, the input clutch is prevented from being rapidly connected (engaged) at least when the brake is released and thus the advantageous effect of suppressing the occurrence of large torque variation can be obtained.

The description of the embodiment has been made on the assumption that the work vehicle is a wheel loader. However, the present invention is equally applicable to other work vehicles as long as the work vehicle is provided with an input clutch (modulation clutch).

Figure 1:
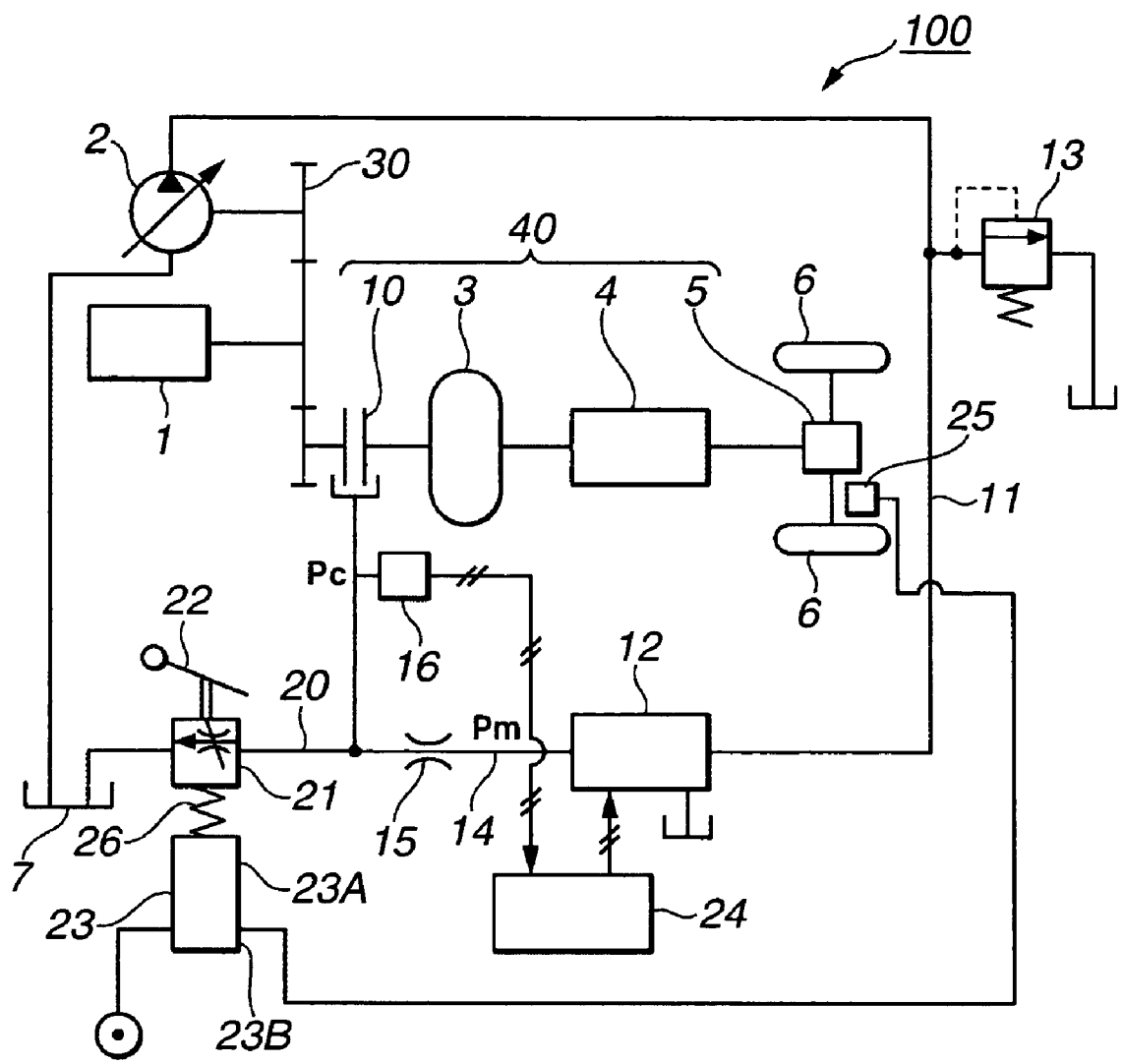
FIG. 1 is a block diagram of an input clutch control device for a work vehicle according to an embodiment, showing a part of the configuration of a wheel loader relating to the present invention.
Figure 2:
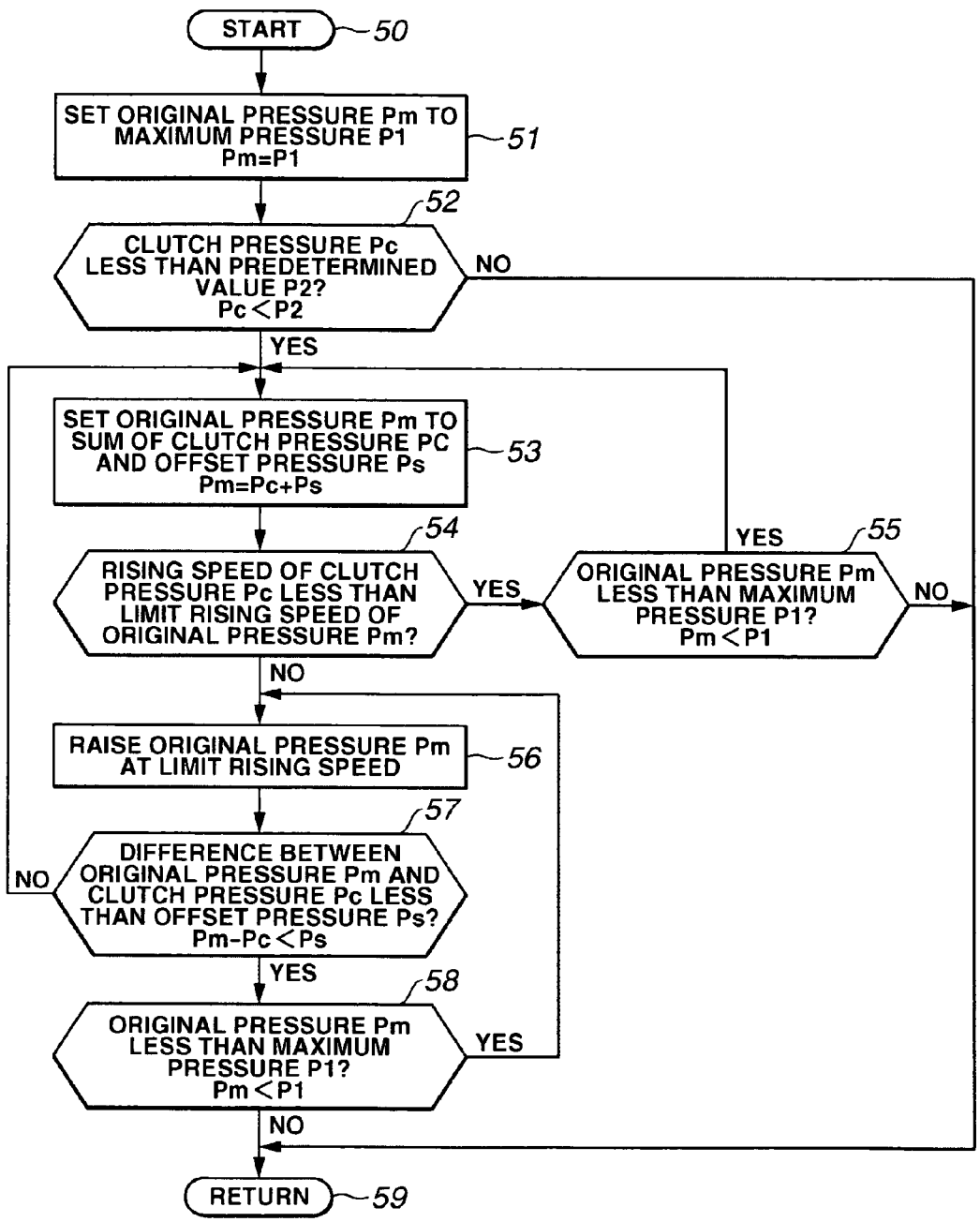
FIG. 2 is a flowchart of a control method according to an embodiment, showing the flow of processing performed by a controller.
Figure 3A:
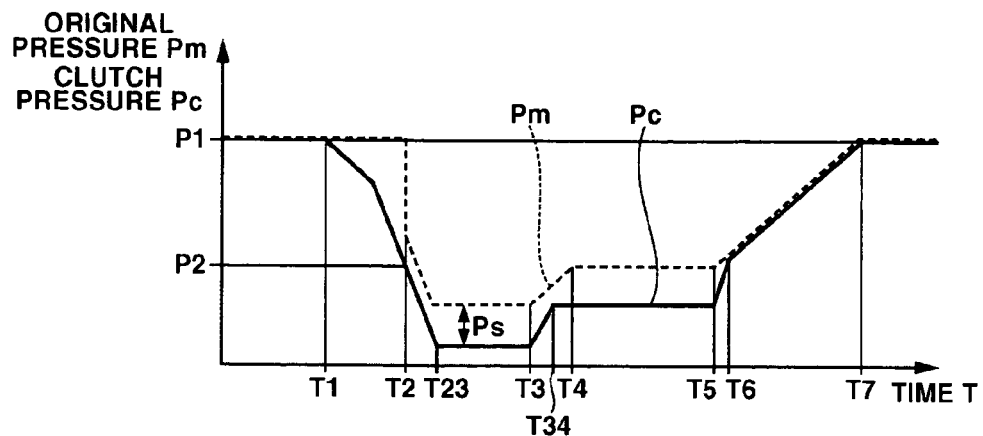
FIG. 3(a) is a diagram illustrating how the clutch pressure of the input clutch and the original pressure are varied with passage of time, wherein time is plotted on the abscissa axis and the clutch pressure of the input clutch and the original pressure are plotted on the ordinate axis, FIG. 3(b) being a diagram illustrating how the depression amount of the brake pedal is varied according time variation, wherein the abscissa axis of FIG. 3(a) is used in common as the time axis.
Figure 3B:
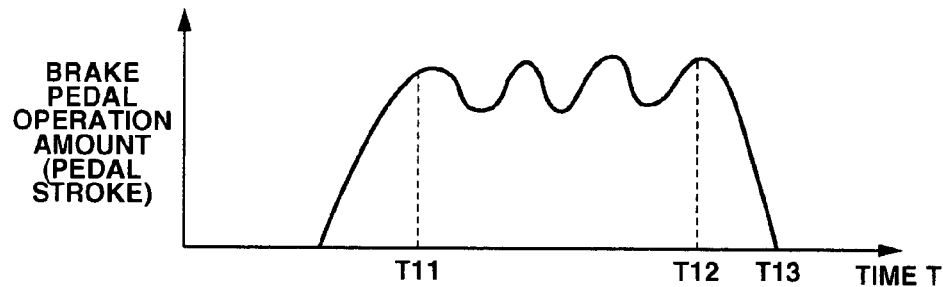
FIG. 3(c) being a diagram illustrating how the clutch pressure of the input clutch is varied according to time variation, wherein the abscissa axis of FIG. 3(a) is used in common as the time axis.
Figure 3C:
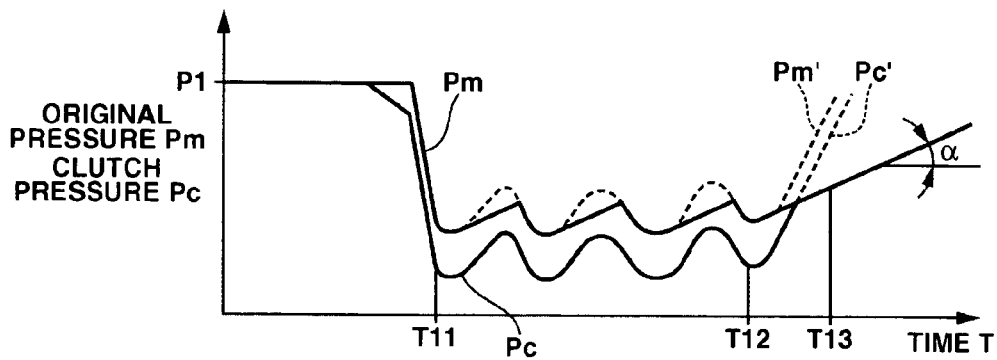
Figure 4:
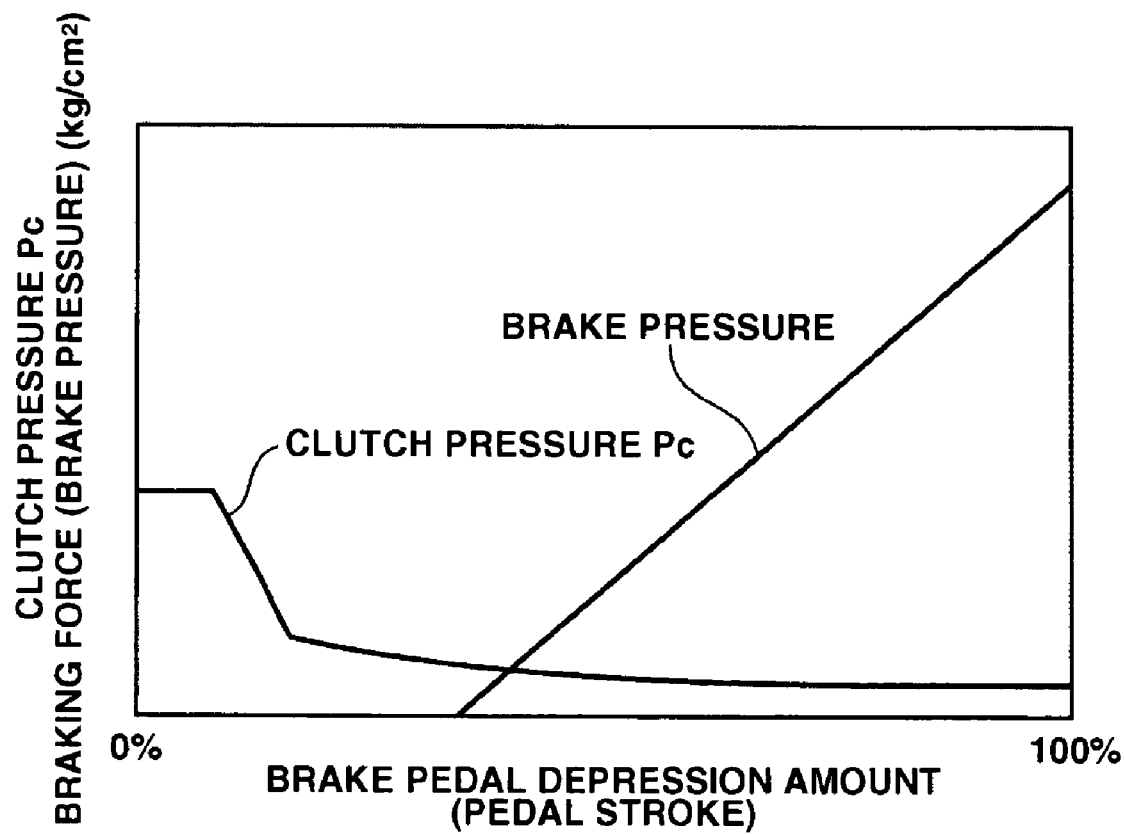
FIG. 4 is a diagram showing relationship between a depression amount of the brake pedal (pedal stroke: 0 to 100%), clutch pressure of the input clutch (kg/cm2), and braking force generated by the brake device (brake pressure: kg/cm2).

The invention claimed is:

1. A control device for an input clutch of a work vehicle, comprising:
an input clutch provided between an engine and a transmission on a power transmission path for the engine;
an orifice provided on an oil passage supplying pressure oil to the input clutch, the orifice having an original pressure at an upstream side and a clutch pressure of the input clutch at a downstream side;
input clutch pressure control means provided to communicate with the oil passage on the downstream side from the orifice to control the clutch pressure of the input clutch such that the clutch pressure of the input clutch is reduced as an operation amount becomes greater;
clutch pressure detection means for detecting the clutch pressure of the input clutch;
determination means for determining whether or not a rising speed of the clutch pressure of the input clutch is less than a limit rising speed of the original pressure; and
original pressure control means which adjusts the original pressure such that a difference between the original pressure and the detected clutch pressure of the input clutch becomes a predetermined offset pressure when it is determined that the clutch pressure rising speed of the input clutch is less than the original pressure limit rising speed, and adjusts the original pressure such that the original pressure is raised at the original pressure limit rising speed when it is determined that the clutch pressure rising speed of the input clutch is equal to or higher than the original pressure limit rising speed.

2. The control device for an input clutch of a work vehicle according to claim 1, comprising:
brake means for reducing a speed of a vehicle body; and
brake operating means for actuating the brake means with a braking force according to an operation amount,
wherein the input clutch pressure control means controls the clutch pressure of the input clutch such that the clutch pressure of the input clutch is reduced as the operation amount of the brake operating means becomes greater.

3. A control device for an input clutch of a work vehicle, comprising:
an input clutch provided between an engine and a transmission on a power transmission path for the engine;
brake means for reducing a speed of a vehicle body;
brake operating means for actuating the brake means with a braking force according to an operation amount;
an orifice provided on an oil passage supplying pressure oil to the input clutch, the orifice having an original pressure at an upstream side and a clutch pressure of the input clutch at a downstream side;
input clutch pressure control means provided to communicate with the oil passage on the downstream side from the orifice to control the clutch pressure of the input clutch such that the clutch pressure of the input clutch is reduced as the operation amount becomes greater;
clutch pressure detection means for detecting the clutch pressure of the input clutch;
determination means for determining whether or not a rising speed of the clutch pressure of the input clutch is less than a limit rising speed of the original pressure; and
original pressure control means for adjusting the original pressure such that the original pressure is raised at the original pressure limit rising speed when it is determined that the clutch pressure rising speed of the input clutch is equal to or higher than the original pressure limit rising speed.

4. A control method for an input clutch applicable to a work vehicle comprising:
an input clutch provided between an engine and a transmission on a power transmission path for the engine;
an orifice provided on an oil passage supplying pressure oil to the input clutch, the orifice having an original pressure at an upstream side and a clutch pressure of the input clutch at a downstream side;
input clutch pressure control means arranged to communicate with the oil passage on the downstream side from the orifice to control the clutch pressure of the input clutch such that the clutch pressure of the input clutch is reduced as an operation amount becomes greater; and
clutch pressure detection means for detecting the clutch pressure of the input clutch,
the control method comprising the steps of:
a) determining whether or not a rising speed of the clutch pressure of the input clutch is less than a limit rising speed of the original pressure; and
b) adjusting the original pressure such that a difference between the original pressure and the detected clutch pressure of the input clutch becomes a predetermined offset pressure, when it is determined that the clutch pressure rising speed of the input clutch is less than the original pressure limit rising speed, or adjusting the original pressure such that the original pressure is raised at the original pressure limit rising speed, when it is determined that the clutch pressure rising speed of the input clutch is equal to or higher than the original pressure limit rising speed.

* * * * *